United States Patent
Rahman et al.

(10) Patent No.: US 9,482,289 B2
(45) Date of Patent: Nov. 1, 2016

(54) SELF-PRELOADING SHIFT LEVER

(71) Applicant: Club Car, LLC, Evans, GA (US)

(72) Inventors: Brian M. Rahman, Maumee, OH (US); Jim Foral, Evans, GA (US); Mike MacConney, Evans, GA (US); Richard Marcus Mansfield, North Augusta, SC (US)

(73) Assignee: Club Car, LLC, Evans, GA (US)

( * ) Notice: Subject to any disclaimer, the term of this patent is extended or adjusted under 35 U.S.C. 154(b) by 1 day.

(21) Appl. No.: 14/513,437

(22) Filed: Oct. 14, 2014

(65) Prior Publication Data

US 2015/0101904 A1 Apr. 16, 2015

Related U.S. Application Data

(60) Provisional application No. 61/890,817, filed on Oct. 14, 2013.

(51) Int. Cl.
*B60K 20/00* (2006.01)
*G05G 9/00* (2006.01)
*F16D 23/12* (2006.01)
*F16D 21/04* (2006.01)
*F16H 61/36* (2006.01)

(52) U.S. Cl.
CPC .............. *F16D 23/12* (2013.01); *F16D 21/04* (2013.01); *F16H 61/36* (2013.01)

(58) Field of Classification Search
CPC ................ F16D 23/12; F16D 23/142; F16D 2023/126; F16H 2063/3089; F16H 2063/3093
USPC ...... 74/335, 339, 470, 473.1, 473.15, 500.5; 192/69.7–69.91, 99 S, 109 A
See application file for complete search history.

(56) References Cited

U.S. PATENT DOCUMENTS

| | | | |
|---|---|---|---|
| 2,029,165 A | | 1/1936 | Hadley et al. |
| 4,022,077 A | * | 5/1977 | Brewer .................. B60K 20/02 192/109 A |
| 4,170,149 A | * | 10/1979 | Koegel ................. F16H 59/041 74/339 |
| 4,299,134 A | | 11/1981 | Roy et al. |
| 4,497,396 A | * | 2/1985 | Davis ................... F16H 59/042 192/109 A |
| 4,579,204 A | | 4/1986 | Iio |
| 5,006,084 A | | 4/1991 | Handa |
| 5,027,673 A | | 7/1991 | Behrens et al. |
| 5,027,931 A | | 7/1991 | Ratke et al. |

(Continued)

FOREIGN PATENT DOCUMENTS

GB 1473844 5/1977

OTHER PUBLICATIONS

International Search Report and Written Opinion in corresponding PCT Application (i.e., PCT/US2014/060441), mailed Jan. 21, 2015 (7 pages).

*Primary Examiner* — Ha D Ho
(74) *Attorney, Agent, or Firm* — Taft, Stettinius & Hollister LLP

(57) ABSTRACT

An exemplary shift lever includes a mounting assembly, a flexible member coupled to the mounting assembly, and an interface coupled to the flexible member. The flexible member is resilient so as to provide a selected biasing force at a predetermined deformation angle, and flexible enough to elastically deform across a selected angular range. The mounting assembly is configured for connection with the input shaft of a transmission, and the interface is configured for connection with an output of a drive selector.

21 Claims, 4 Drawing Sheets

(56) References Cited

U.S. PATENT DOCUMENTS

| | | |
|---|---|---|
| 5,029,683 A | 7/1991 | Grunberg et al. |
| 5,187,998 A | 2/1993 | Asano et al. |
| 5,845,536 A | 12/1998 | Certeza |
| 6,170,623 B1 | 1/2001 | Eismann et al. |
| 6,691,816 B2 | 2/2004 | Houston |
| 7,617,904 B1 * | 11/2009 | Einboeck ............... F16H 63/30 180/336 |
| 8,276,473 B2 | 10/2012 | Kobayashi et al. |
| 2005/0257637 A1 | 11/2005 | Osamura et al. |

* cited by examiner

US 9,482,289 B2

SELF-PRELOADING SHIFT LEVER

CROSS-REFERENCE TO RELATED APPLICATION

This application claims the benefit of U.S. Provisional Application No. 61/890,817, filed Oct. 14, 2013, which is incorporated herein by reference in its entirety.

TECHNICAL FIELD

The present invention generally relates to transmission shift levers, and more particularly, but not exclusively, to shift levers for transmissions having dog-clutches.

BACKGROUND

Transmissions of small utility vehicles often utilize a dog-clutch assembly operable to adjust the configuration of the transaxle. To shift gears, a user adjusts the position of a dogged shifting gear within the transmission by actuating a shifter handle. Transmissions of this type can only shift into gear when the dogs of the shifting gear and the driving gear are properly aligned. If the dogs are misaligned (a state often referred to as dead-head), the shifting gear cannot move into engagement with the driving gear.

Conventional shifting systems utilizing dog-clutches suffer from a variety of limitations and disadvantages, such as those relating to shifting gears when the transmission is dead-headed. For example, when the dogs are not aligned, the user must continue to apply force to the shifter handle until the dogs become aligned. Once the dogs become aligned, the force provided by the user causes the shifting gear to move into engagement with the driving gear, and the user can stop applying force to the shifter handle. There is a need for the unique and inventive gear-shifting apparatuses, systems and methods disclosed herein.

SUMMARY

An exemplary shift lever includes a mounting assembly, a flexible member coupled to the mounting assembly, and an interface coupled to the flexible member. The flexible member is resilient enough to provide a selected biasing force at a predetermined deformation angle, and flexible enough to elastically deform across a selected angular range. The mounting assembly is configured for connection with the input shaft of a transmission, and the interface is configured for connection with an output of a drive selector.

DETAILED DESCRIPTION OF ILLUSTRATIVE EMBODIMENTS

Figure 1A:
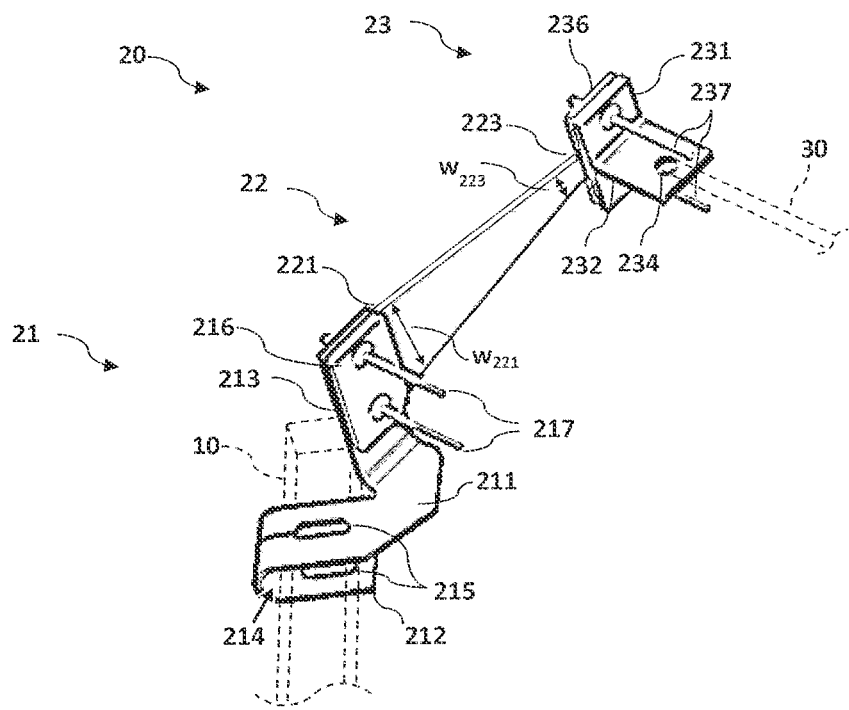
FIG. 1a is a perspective illustration of a shift lever according to an embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1a, an exemplary shift lever 20 according to an embodiment of the invention is depicted connecting a transmission input shaft 10 to a drive selector push/pull cable 30. The shift lever 20 includes a mounting assembly 21 configured for connection with the input shaft 10, a flexible member 22, and an interface 23 configured for connection with the push/pull cable 30. One end of the flexible member 22 is coupled to the mounting assembly 21, and the other end of the flexible member 22 is coupled to the interface 23.

The exemplary mounting assembly 21 includes a base portion 211, a first arm 212 facing the base portion 211, and a second arm 213 extending from the base portion 211. The first arm 212 is spaced apart from the base portion 211, such that a channel 214 is defined therebetween. The channel 214 is configured to receive the input shaft 10, which may be secured to the mounting assembly 21 by fasteners (see FIG. 1b) extending through openings 215 in the base portion 211 and the first arm 212. While the illustrated channel 214 is defined by substantially parallel walls (i.e. the base member 211 and the first arm 212), the configuration of the base member 211, the first arm 212, and the channel 214 may of course vary depending upon the geometry of the input shaft 10. During assembly, the flexible member 22 is sandwiched between the second arm 213 and a plate 216, and the mounting assembly 21 is coupled to the flexible member 22 by fasteners such as rivets 217, which secure the flexible member 22 between the second arm 213 and the plate 216.

Figure 1B:
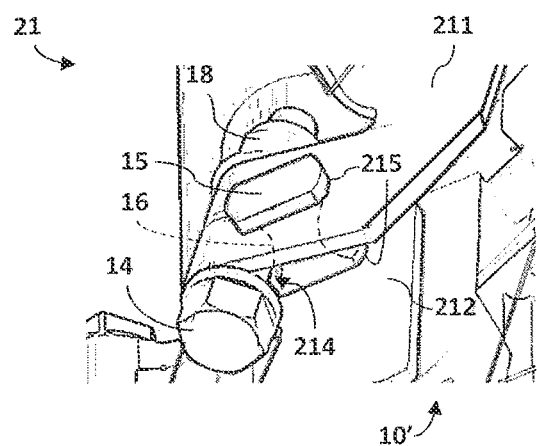
FIG. 1b is a perspective illustration of an exemplary coupling between a shift lever and a transmission input shaft.

Turning briefly to FIG. 1b, a non-limiting exemplary form of coupling an input shaft 10' to the mounting assembly 21 is depicted. The illustrated coupling includes a bolt 14 extending through the channel 214, a protrusion 15 extending through the openings 215 and coupled to the input shaft 10', and a nut 18 axially retaining the bolt 14. The protrusion 15 includes a concave surface 16 configured for engagement with the bolt 14. When the bolt 14 is positioned in the cavity 214 between the curved surface of the mounting assembly 21, relative motion of the input shaft 10' and the mounting assembly 21 is substantially prevented.

Returning to FIG. 1a, the flexible member 22 is illustrated in a natural (i.e. undeformed) state. While the exemplary flexible member 22 is substantially planar in the natural state, other forms are also contemplated. For example, the natural state of the flexible member 22 may include curvilinear surfaces in certain embodiments. The flexible member 22 is configured to elastically deform from its natural state in response to relative movement of the mounting assembly 21 and the interface 23. That is to say, if the push/pull cable 30 causes the interface 23 to move while the input shaft 10 retains the mounting assembly 21 in place, the flexible member 22 will bend to a deformed state. In the deformed state, the flexible member 22 provides a biasing torque which urges the mounting assembly 21 and the interface 23 to return to the relative positions corresponding to the natural state of the flexible member 22.

The flexible member 22 is resilient enough to provide a selected biasing force at a predetermined angle of deformation, and flexible enough to elastically deform across a selected angular range. As described in further detail below, the biasing force, deformation angle, and angular range depend upon characteristics of the system in which the shift lever 20 is to be utilized. The flexible member 22 may be formed of any number of materials which provide the desired characteristics. For example, the flexible member 22 may be formed of a composite material such as fiberglass, or a spring steel such as blue tempered AISI 1095 spring steel.

The flexible member 22 includes a first portion 221 adjacent to the mounting assembly 21 and a second portion 223 adjacent to the interface 23. In the illustrated embodiment, the first portion width $w_{221}$ is greater than the second portion width $w_{223}$, and the flexible member 22 tapers inward from the first portion 221 to the second portion 223. As with other features of the shift lever 20, the precise geometry of the resilient member 22 may be customized according to the needs of a particular application. For example, in certain embodiments, the second portion width $w_{223}$ may greater than the first portion width $w_{221}$, or the first portion width $w_{221}$ and the second portion width $w_{223}$ may be the same or substantially similar.

The interface 23 includes a base portion 231 and an arm 232 having an opening 234 by which the cable 30 can be attached to the interface 23. While the illustrated interface 23 is configured for attachment to the cable 30, the interface 23 may be of another form, for example if the output of the drive selector is a rigid member. During assembly, the flexible member 22 is sandwiched between the base portion 231 and a plate 236, and the interface 23 is coupled to the flexible member 22 by fasteners such as rivets 237, which secure the flexible member 22 between the base portion 231 and the plate 236. In certain embodiments, the portion of the flexible member 22 between the base portion 231 and the plate 236 may include extensions having openings through which the fasteners extend.

While the illustrated flexible member 22 is coupled to the mounting assembly 21 and the interface 23 as described above, other forms of coupling are also contemplated. For example, the mounting assembly 21 and/or the interface 23 may be molded or die-cast onto the flexible member 22, thereby eliminating the rivets 217, 237 and reducing the part count. In other forms, one or both of the mounting assembly 21 and the interface 23 may be integrally formed with the flexible member 22, for example as a molded composite.

As illustrated in FIG. 1a, the mounting assembly 21 and the interface 23 are connected only by the flexible member 22, such that all torque transmitted between the input shaft 10 and the cable 30 is also transmitted to the flexible member 22. The inventive shift lever 20 can thus include fewer parts than a rigid shift lever having a separate biasing member. As will be appreciated by those having skill in the art, reduced part counts are often desirable, as there are fewer points of potential failure.

Figure 2:
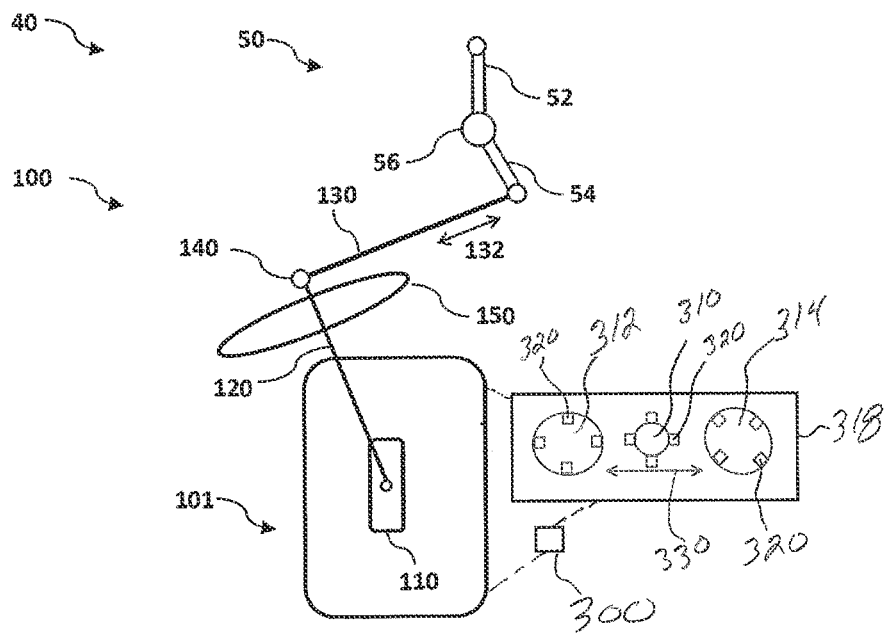
FIG. 2 is a schematic illustration of a shifting system including a drive-shifting assembly according to an embodiment of the invention.

With reference to FIG. 2, an exemplary shifting system 40 includes a drive selector 50 operatively coupled to a drive-shifting assembly 100. The drive selector 50 includes an input crank 52, which is rotationally coupled to an output crank 54 by a shaft 56. The drive-shifting assembly 100 is configured to adjust the configuration of a transmission 101, and includes an input shaft 110 of the transmission 101, a flexible shift lever 120 coupled to the input shaft 110, a push-pull cable 130 connected to the output crank 54, and an interface 140 coupling the shift lever 120 to the cable 130. The coupling of the input shaft 110, shift lever 120, and cable 130 may be similar to that described with reference to FIGS. 1a and 1b, or may be of another form. In certain embodiments, the drive-shifting assembly 100 may further include a limiting member 150 constraining the range of motion of the shift lever 120. The limiting member can be any mechanism known to those skilled in the art such as one or more abutment members extending into a path of travel of the shift lever 20.

During operation of the system 40, a user rotates the input crank 52 (for example by applying a force to a shifter knob or handle), thereby causing the output crank 54 to rotate accordingly. Rotation of the output crank 54 extends or retracts the push/pull cable 130 in the direction indicated by the arrows 132, which in turn adjusts the position of the interface 140. The drive selector 50 is operable in a plurality of discrete positions; when in one of the discrete positions, the drive selector 50 resists rotation therefrom. Thus, when a user selects a gear by adjusting the drive selector 50 to one of the discrete positions, the drive selector 50 will remain in that position until the user applies a force sufficient to overcome the resistive force. The drive selector 50 may be of the type disclosed in the commonly-owned co-pending application entitled DRIVE SELECTOR (filed Oct. 14, 2013 as U.S. Provisional Patent Application No. 61/890,842), although other forms are also contemplated. Because the position of the interface 140 corresponds to that of the output crank 54, adjusting the drive selector 50 to one of the discrete positions causes the interface 140 to be retained in a corresponding position.

The transmission 101 comprises a portion of a vehicle's drive train, and is operable to adjust the configuration of a transaxle 300. The transmission 101 can be used to transmit power from a prime mover such as an electric motor or an internal combustion engine and the like to the drive train of a vehicle. Various forms of vehicles can utilize the exemplary shifting 40 and transmission 101 system defined in the present application. Exemplary vehicles can include, but are not limited to utility vehicles such as those of the type made or sold by Club Car, LLC. The exemplary utility vehicles can be for personal or commercial purposes and can include land based vehicles or water based vehicles such as golf carts and in-board powered boats or the like.

As is known in the art, a user can select a gear configuration for the transmission 101 by actuating the input shaft 110 that can be connected to a dog clutch 310. The dog clutch 310 is operable with first and second dog selector gears 312, 314 schematically shown in component 318. In one form the dog selector gears 312, 314 include a forward gear and a reverse gear. In other forms the selector gears can be a pair of forward gears or alternatively a pair of reverse gears. The dog clutch 310, and the gears 312, 314 include a plurality of dogs 320 associated therewith. The dog clutch 310 is moveable between the gears 312, 314 as represented by double arrow 330. Rotation of the input shaft 110 moves the dog clutch 310 with respect to the dogged selector gear which is coupled to a driven shaft (not shown) and a dogged driving gear which is coupled to a driving shaft (not shown). When the dogs 320 of the clutch are aligned and engaged with the dogs of one of the gears 312, 314, rotary motion can be transmitted from the driving shaft to the driven shaft in the selected manner. If, however, the dogs are not properly aligned (that is to say, if the transmission is dead-headed), the gears cannot engage, and the input shaft 110 becomes locked. As a result, the input shaft 110 will not rotate to the desired position, and the transmission 101 will not shift into gear until the dogs 320 become aligned.

Figure 3:
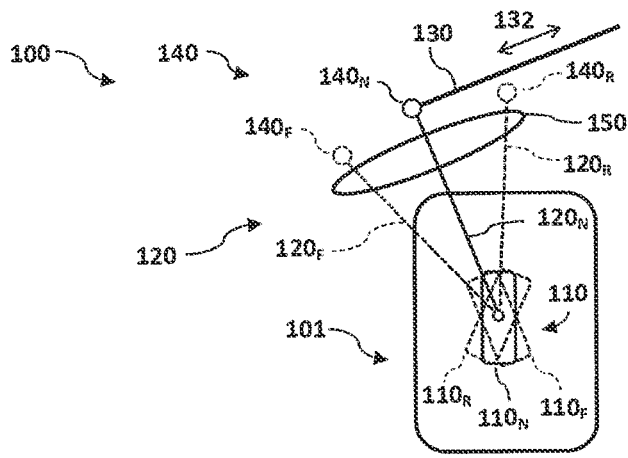
FIGS. 3-7 depict the drive-shifting assembly in various states of operation.

With additional reference to FIG. 3, the illustrated transmission 101 is a Forward-Neutral-Reverse transmission operable in Forward, Neutral, and Reverse modes when the input shaft 110 is in the corresponding Forward, Neutral, or Reverse position $110_F$, $110_N$, $110_R$, respectively. It is also contemplated that the transmission 101 may be operable in additional or alternative modes corresponding to additional or alternative positions of the input shaft 110. For example, in certain embodiments, the transmission 101 may be operable in a low gear ratio in a first position of the input shaft 110, and a higher gear ratio in a second position of the input shaft 110.

The shift lever 120 is of the type described with reference to FIG. 1*a*, and may be substantially similar to the shift lever 20. Like the above-described shift lever 20, the shift lever 120 includes a flexible member configured to elastically deform across an elastic deformation range. The shift lever 120 includes a first end coupled to the input shaft 110, and a second end coupled to the cable 130 via the interface 140. The coupling of the first end and the input shaft 110 substantially prevents the first end from rotating or pivoting with respect to the input shaft 110. The coupling of the second end and the cable 130 at the interface 140 is such that extending or retracting the cable 130 results in movement of the interface 140 and actuation of the shift lever 120.

The illustrated cable 130 is a push/pull cable configured to transmit force in opposing directions 132. As described above, the selector system 50 is operable to retain the cable 130 in one of a plurality of discrete positions, which in turn retains the interface 140 in a Forward, Neutral, or Reverse position $140_F$, $140_N$, $140_R$. While the cable 130 is depicted as a straight line, it is to be understood that the cable 130 may of course be flexible, so long as it is capable of transmitting force in both forward and backward directions. In certain embodiments, the output crank 54 may be connected to the interface 140 by an element other than the cable 130, such as a rigid connection member.

Under ideal operating conditions, the input shaft 110 is free to rotate to a new position, and movement of the interface 140 results in rotation of the input shaft 110 and the shift lever 120. For example, movement from the Neutral interface position $140_N$ or similar fashion to the Reverse positions $110_R$ or $120_R$ to the Forward interface position $140_E$ causes the input shaft 110 and the shift lever 120 to also rotate from Neutral positions $110_N$, $120_N$ to Forward positions $110_F$, $120_F$. If the transmission 101 is in the dead-head state, however, the input shaft 110 becomes locked as described above. For ease and convenience of description, the input shaft 110 is described hereinafter as being locked in one of the Forward, Neutral, and Reverse positions $110_F$, $110_N$, $110_R$. It is to be understood, however, that the input shaft 110 may rotate from these positions, and only become locked as it approaches another of the positions. For example, while the following description refers to the input shaft 110 as being locked in the Neutral position $110_N$, the input shaft 110 may rotate from the Neutral position $110_N$, and become locked in a position closer to the Forward or Reverse position $110_F$, $110_R$.

Figure 4:
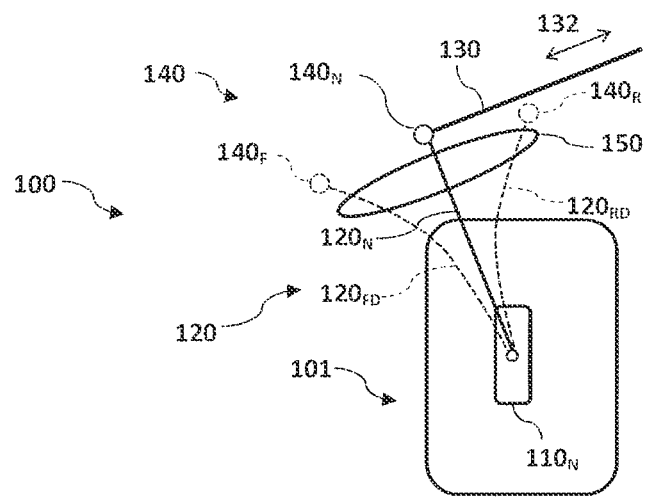

FIG. 4 illustrates the drive-shifting assembly 100 with the transmission 101 locked in the Neutral mode. Because the input shaft 110 cannot rotate from the Neutral position $110_N$, movement of the interface 140 causes the shift lever 120 to elastically deform. For example, the shift lever 120 bends to a Forward deformed state $120_{FD}$ in response to the Forward interface position $140_F$, and bends to a Reverse deformed state $120_{RD}$ in response to the Reverse interface position $140_R$. Due to the resilient nature of the shift lever 120, this deformation results in a preloading torque which urges the input shaft 110 toward the appropriate position.

In embodiments which include a limiting member 150, the limiting member 150 constrains the range of motion of the shift lever 120, preventing permanent deformation of the flexible member. While the limiting member 150 is illustrated as a constraining ring, other forms are also contemplated. For example, the limiting member of certain embodiments may include rigid arms extending from the input shaft 110 or the end of the shift lever 120 coupled to the input shaft 110.

Figure 5:
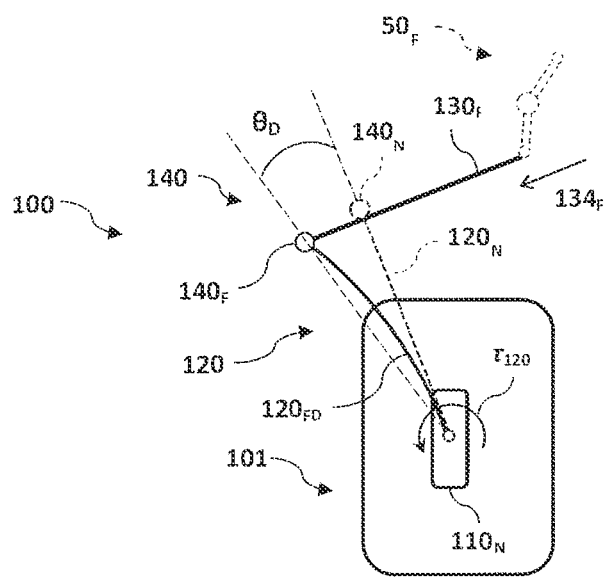
Figure 6:
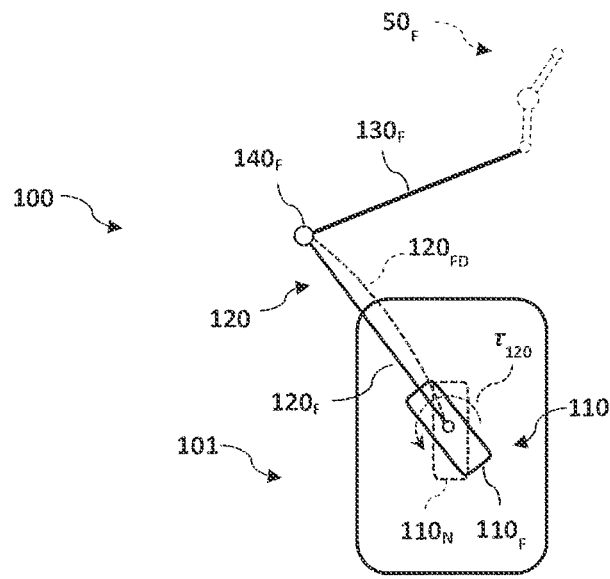

FIGS. 5 and 6 depict the drive-shifting assembly 100 at various stages of an exemplary shifting process. The input shaft 110 is initially locked in the Neutral position $110_N$, and is shifted to the Forward position $110_E$ as a result of the process. One having skill in the art will readily understand that similar stages occur when the input shaft 110 is initially locked in one of the positions, and is shifted to an adjacent position (for example from the Forward position $110_E$ to the Neutral position $110_N$).

As illustrated in FIG. 5, the shift lever 120 and the interface 140 begin in the Neutral positions $120_N$, $140_N$ (depicted in phantom). As the user adjusts the drive selector 50 from its Neutral position to its Forward position $50_F$, the cable 130 transmits a force $134_F$ urging the interface 140 toward the Forward position $140_F$. Because the input shaft 110 cannot rotate to its Forward position $110_F$, the shift lever 120 bends to the Forward deformed state $120_{FD}$, resulting in a preloading torque $T_{120}$. The Forward deformed state $120_{FD}$ is offset from the natural state of the shift lever 120 (in this case, the Neutral position $120_N$) by a deformation angle $\theta_D$. The deformation angle $\theta_D$ corresponds to an angle between a position of the input shaft 110 in which the dogs are fully mated and a position of the input shaft 110 in which the dogs prevent rotation of the input shaft 110.

The magnitude of the preloading torque $T_{120}$ depends upon a number of factors, including the deformation angle $\theta_D$ and the effective spring constant of the shift lever 120. As will be appreciated by those having skill in the art, the spring constant of the shift lever 120 also depends upon a number of factors, including the material and configuration of the flexible member. Thus, given the deformation angle $\theta_D$, the preloading torque $T_{120}$ can be made sufficient to rotate the input shaft 110 by selecting appropriate material and configuration for the shift lever 120.

FIG. 6 illustrates the drive-shifting assembly 100 after the user has moved the drive selector 50 to the Forward position $50_F$. Also depicted (in phantom) are the Neutral input shaft position $110_N$, the Forward deformed shift lever position $120_{FD}$, and the preloading torque $T_{120}$. As described above, the drive selector 50 is configured to remain in a selected discrete position (in this case, the Forward position $50_F$) until the user provides a force sufficient to move the drive selector 50 from the previously-selected discrete position. Because the drive selector 50 cannot move from the Forward position $50_F$, the interface 140 cannot move from the Forward position $140_F$, and the shift lever 120 continues to apply the torque $T_{120}$ to the input shaft 110 without further action by the user. The torque $T_{120}$ preloads the dogs, ensuring that the shifting gear and the driving gear engage once the dogs align.

As rotation of the transaxle brings the dogs into alignment, the input shaft 110 again becomes free to rotate. When this occurs, the preloading torque $T_{120}$ causes the input shaft 110 to rotate to the Forward position $110_F$ as the shift lever 120 transitions from the Forward deformed state $120_{FD}$ to the Forward position $120_F$. Once the input shaft 110 is in the Forward position $110_F$, the shifting and driving gears are engaged, and the transmission 101 operates in the Forward mode. As can be seen from the foregoing, the resilient nature of the shift lever 120 and the selective retention by the drive selector 50 enables the system 40 to preserve the user's intended gear-setting, even when the transmission 101 will not shift into the selected gear.

Figure 7:
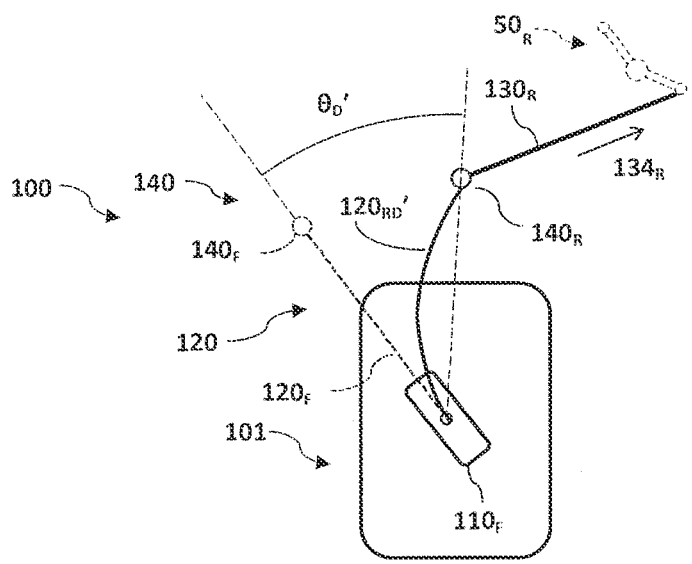

FIG. 7 depicts the drive-shifting assembly 100 with the input shaft 110 locked in the Forward position 110$_F$ due to misalignment of the dogs. If the user attempts to shift directly from Forward to Reverse (i.e. before the input shaft 110 can rotate to the Neutral position 110$_N$), the force 134$_R$ transmitted through cable 130$_R$ will cause the interface 140 will move to the Reverse position 140$_R$ while the input shaft 110 remains in the Forward position 110$_F$. This causes the shift lever 120 to bend to a Reverse deformed state 120$_{RD}'$, which is offset from the Forward position 120$_E$ by a deformation angle $\theta_D'$. Because this is the most deformation possible in the illustrated drive-shifting assembly 110, the deformation angle $\theta_D'$ can be considered a maximum deformation angle $\theta_{max}$.

The shift lever 120 of the illustrated embodiment is flexible enough to bend to the highly deformed state 120$_{RD}'$ without plastic deformation. As with the spring constant, the flexibility of the shift lever 120 depends upon a number of factors, including the material and configuration of the flexible member. Thus, given the maximum deformation angle $\theta_{max}$ for a particular drive-shifting assembly 100, the shift lever 120 can be provided with a corresponding elastic deformation range by selecting appropriate material and configuration. The elastic deformation range required for a particular shift lever 120 may of course vary according to a number of factors. For example, in embodiments in which the input shaft 110 is operable across a broad angular range, the shift lever 120 may be more flexible than embodiments in which the input shaft 110 is operable across a narrower angular range.

Returning to FIG. 1a, the shift lever 20 operates in a manner analogous to that described above with respect to FIGS. 2-7. When a user selects a new gear with the drive selector, the cable 30 moves the interface 23 with respect to the mounting assembly 21. This movement causes rotation of the shift lever 20 and/or deformation of the flexible member 22. If the dogs in the transmission are properly aligned, the shift lever 20 rotates and the input shaft 10 moves to the selected position; if the transmission is deadheaded, the flexible member 22 deforms elastically, creating a preloading torque. When the drive selector is in one of the discrete positions, the cable 30 retains the flexible member 22 in the deformed state, and the shift lever 20 continues to apply the preloading torque to the input shaft 10. Once the transaxle begins spinning and the dogs become aligned, the input shaft 10 rotates to the selected position as the flexible member 22 returns to its natural state.

While FIG. 1a illustrates an exemplary form of the shift lever 20, the design parameters of the inventive shift lever are scalable. That is to say, the length and form of the shift lever 20 can be altered to accommodate the preload a particular transmission requires for shifting. For each application, the shift lever 20 may be customized to have a spring rate sufficient to shift the transmission, and to ensure that flexible member 22 does not suffer permanent deformation in even the most severe cases of over-flexure (as described with respect to FIG. 7).

In one aspect the present disclosure includes an apparatus comprising: a transmission having an associated dog clutch; a rotatable input shaft connected to the dog clutch; a shift lever having a unitary flexible member extending between first and second ends, the shift lever operably coupled to the input shaft at the first end; a drive selector operably coupled to the second end of the shift lever; and wherein the drive selector is movable between first and second positions and the unitary flexible member elastically deforms through a predetermined angle corresponding to the first and second positions when the dog clutch is out of alignment.

Refining aspects include an apparatus wherein the unitary flexible member generates a preload on the input shaft when deformed at the predetermined angle; wherein the preload of the unitary flexible member rotates the input shaft when the dog clutch moves into alignment; wherein rotation of a transaxle of the transmission brings the dog clutch into alignment; further comprising an abutment to limit the travel of the second end of the flexible member; wherein the maximum deflection of the flexible member is limited by a pair of abutments; wherein the flexible member is formed from one of a composite, a metal or combinations thereof; wherein the flexible member includes a tapered wall; and wherein the flexible member is non-planar in an unloaded natural state.

In another aspect the present disclosure includes a system comprising: a vehicle with a transmission having at least two gear outputs; a dog clutch operable with the transmission, wherein the dog clutch includes two opposing clutch members with a plurality of dogs formed thereon and wherein the transmission can only shift gears when the dogs are aligned; a rotatable input shaft connected to the dog clutch; a shift lever having a unitary flexible member extending between first and second ends, the shift lever operably coupled to the input shaft at the first end; a drive selector operably coupled to the second end of the shift lever; and wherein the drive selector is movable between first and second positions and the unitary flexible member elastically deforms through a predetermined angle corresponding to the first and second positions when the dogs are misaligned.

Refining aspects include a system, wherein the at least two gear outputs include a forward gear and a reverse gear; wherein the at least two gear outputs include a neutral gear and a plurality of forward and reverse gears; wherein the elastically deformed flexible member generates a preload torque to rotate the input shaft after the dogs move into alignment, wherein rotation of a transaxle brings the dogs into alignment; wherein the flexible member and an interface is a single molded composite structure; wherein the flexible member includes nonlinear portions in an unloaded natural state; wherein the flexible member includes non-symmetrical portions about at least one imaginary plane extending therethrough in an unloaded natural state; and wherein the vehicle includes land based and water based vehicles.

Another aspect of the present disclosure includes method comprising: moving a shift lever from a first position to a second position; deflecting a unitary flexible member in response to the moving when a dog clutch is misaligned; rotating the transaxle to align the dog clutch; rotating an input shaft with a preload force of the deflected flexible member after the dog clutch is aligned; and shifting a transmission into a different gear in response to the rotating of the input shaft.

Refining aspects include a method further comprising constraining the deflecting to a maximum predetermined angle; and wherein the constraining includes at least one abutment extending into a pathway of a movable member.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an input crank having first and second ends;
a user handle connected to the first end of the input crank;
a pivot shaft connected to the second end of the input crank;
an output crank extending from the pivot shaft;
a push-pull cable connected to the output crank;
a transmission having an associated dog clutch;
a rotatable input shaft connected to the dog clutch;
a shift lever having a unitary flexible member extending between first and second ends, the shift lever operably coupled to the input shaft at the first end and to the push-pull cable at the second end;
and
wherein the push-pull cable is movable between first and second positions and the unitary flexible member transmits all torque load between the push-pull cable and the input shaft and the unitary flexible member elastically deforms through a predetermined angle corresponding to the first and second positions when the dog clutch is out of alignment.

2. The apparatus of claim 1, wherein the unitary flexible member generates a preload on the input shaft when deformed at the predetermined angle.

3. The apparatus of claim 2, wherein the preload of the unitary flexible member rotates the input shaft when the dog clutch moves into alignment.

4. The apparatus of claim 1, wherein rotation of a transaxle of the transmission brings the dog clutch into alignment.

5. The apparatus of claim 1, further comprising an abutment to limit the travel of the second end of the flexible member.

6. The apparatus of claim 1, wherein the maximum deflection of the flexible member is limited by a pair of abutments.

7. The apparatus of claim 1, wherein the flexible member is formed from one of a composite, a metal or combinations thereof.

8. The apparatus of claim 1, wherein the flexible member includes a tapered wall.

9. The apparatus of claim 1, wherein the flexible member is non-planar in an unloaded natural state.

10. A system comprising:
a vehicle with a transmission having at least two gear outputs;
a dog clutch operable with the transmission, wherein the dog clutch includes two opposing clutch members with a plurality of dogs formed thereon and wherein the transmission can only shift gears when the dogs are aligned;
a rotatable input shaft connected to the dog clutch;
a shift lever having a unitary flexible member extending between first and second ends, the shift lever operably coupled to the input shaft at the first end;
a drive selector operably coupled to the second end of the shift lever, wherein the drive selector includes:
a user input crank coupled to a pivot shaft;
an output crank extending from the pivot shaft; and
a push-pull cable connected to the output crank; and
wherein the drive selector is movable between first and second positions and the unitary flexible member is configured to transmit all torque load between the drive selector and the rotatable input shaft such that the unitary flexible member elastically deforms through a predetermined angle corresponding to the first and second positions when the dogs are misaligned.

11. The system of claim 10, wherein the at least two gear outputs include a forward gear and a reverse gear.

12. The system of claim 10, wherein the at least two gear outputs include a neutral gear and a plurality of forward and reverse gears.

13. The system of claim 10, wherein the elastically deformed flexible member generates a preload torque to rotate the input shaft after the dogs move into alignment.

14. The system of claim 10, wherein rotation of a transaxle brings the dogs into alignment.

15. The system of claim 10, wherein the flexible member and an interface is a single molded composite structure.

16. The system of claim 10, wherein the flexible member includes nonlinear portions in an unloaded natural state.

17. The system of claim 10, wherein the flexible member includes non-symmetrical portions about at least one imaginary plane extending therethrough in an unloaded natural state.

18. The system of claim 10, wherein the vehicle includes land based and water based vehicles.

19. A method comprising:
moving an input crank;
pivoting an output crank about a pivot in response to the moving of the input crank;
moving a push-pull cable in response to the pivoting of the output crank;
moving a shift lever from a first position to a second position with the push-pull cable;
deflecting a unitary flexible member in response to the moving when a dog clutch is misaligned;
rotating the transaxle to align the dog clutch;
rotating an input shaft with a preload force of the deflected flexible member after the dog clutch is aligned; and
shifting a transmission into a different gear in response to the rotating of the input shaft.

20. The method of claim 19, further comprising constraining the deflecting to a maximum predetermined angle.

21. The method of claim 20, wherein the constraining includes at least one abutment extending into a pathway of a movable member.

* * * * *